US007211978B2

United States Patent
Chang et al.

(10) Patent No.: US 7,211,978 B2
(45) Date of Patent: May 1, 2007

(54) MULTIPLE ROBOT ARM TRACKING AND MIRROR JOG

(75) Inventors: Tien L. Chang, Troy, MI (US); H. Dean McGee, Rochester Hills, MI (US); Eric Wong, Troy, MI (US); Sai-Kai Cheng, Rochester Hills, MI (US); Jason Tsai, Bloomfield Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 0 days.

(21) Appl. No.: 10/872,270

(22) Filed: Jun. 18, 2004

(65) Prior Publication Data

US 2004/0257021 A1   Dec. 23, 2004

Related U.S. Application Data

(60) Provisional application No. 60/480,582, filed on Jun. 20, 2003.

(51) Int. Cl.
*B25J 3/00* (2006.01)
*B25J 9/00* (2006.01)
*G05B 19/423* (2006.01)
*G05B 19/18* (2006.01)
*G06F 9/46* (2006.01)

(52) U.S. Cl. .......................... 318/568.11; 318/568.13; 318/568.21; 318/568.24; 901/2; 901/3; 901/6; 901/19; 901/30; 901/41

(58) Field of Classification Search ................ 318/565, 318/569, 568.2, 568.11, 568.24, 600–603, 318/625, 626; 700/182, 245, 248; 901/2, 901/3, 8, 30
See application file for complete search history.

(56) References Cited

U.S. PATENT DOCUMENTS

| 3,890,552 A | 6/1975 | Devol et al. |
| 4,503,507 A | 3/1985 | Takeda et al. |
| 4,613,943 A | 9/1986 | Miyake et al. |
| 4,853,874 A | 8/1989 | Iwamoto et al. |
| 5,023,808 A | 6/1991 | Seraji |

(Continued)

FOREIGN PATENT DOCUMENTS

| EP | 0 345 813 | 12/1989 |
| EP | 0 369 026 | 5/1990 |
| EP | 0 602 657 | 6/1994 |
| EP | 0 752 633 | 1/1997 |

*Primary Examiner*—Lincoln Donovan
*Assistant Examiner*—Eduardo Colon Santana
(74) *Attorney, Agent, or Firm*—Fraser Clemens Martin & Miller LLC; William J. Clemens (57) ABSTRACT

A system for performing the method of this invention includes a leader having a robot arm able to articulate about first axes and supporting an end effector. A follower includes a robot arm able to articulate about respective second axes. Servo motors articulate the leader arm about the first axes and the follower arm about the second axes. A user interface allows a user to jog the arm of the leader and to program movement of the arms for automatic execution such that the end effector reaches predetermined positions. A controller, operatively connected to the servo motors and the user interface, controls operation of the servo motors, moves the arm of the leader in accordance with the programmed movement, and moves the arm of the follower such that it tracks or mirrors movement of the leader.

22 Claims, 4 Drawing Sheets

U.S. PATENT DOCUMENTS

| | | |
|---|---|---|
| 5,072,361 A | 12/1991 | Davis et al. |
| 5,204,942 A | 4/1993 | Otera et al. |
| 5,254,923 A | 10/1993 | Kanitani |
| 5,333,242 A | 7/1994 | Watanabe et al. |
| 5,412,759 A | 5/1995 | Yano et al. |
| 5,596,683 A | 1/1997 | Kasagami et al. |
| 5,784,542 A * | 7/1998 | Ohm et al. .................. 700/260 |
| 5,841,258 A | 11/1998 | Takenaka |
| 5,889,924 A * | 3/1999 | Okabayashi et al. ........ 700/245 |
| 5,980,082 A * | 11/1999 | Watanabe et al. ............. 700/86 |
| 6,124,693 A * | 9/2000 | Okanda et al. ........ 318/568.11 |
| 6,144,884 A * | 11/2000 | Niemeyer et al. ..... 318/568.11 |
| 6,188,194 B1 * | 2/2001 | Watanabe et al. ........... 318/625 |
| 6,233,504 B1 * | 5/2001 | Das et al. .................... 700/260 |
| 6,249,718 B1 | 6/2001 | Gilliland et al. |
| 6,330,493 B1 | 12/2001 | Takahashi et al. |
| 6,385,509 B2 | 5/2002 | Das et al. |
| 6,401,011 B1 | 6/2002 | Hashimukai |
| 6,434,448 B1 * | 8/2002 | Kosaka et al. ......... 318/568.16 |
| 6,507,163 B1 | 1/2003 | Allen |
| 6,556,891 B2 | 4/2003 | Hietmann et al. |
| 6,825,634 B2 * | 11/2004 | Tatar et al. ................. 318/625 |
| 6,853,881 B2 * | 2/2005 | Watanabe et al. ...... 318/568.11 |
| 6,879,880 B2 * | 4/2005 | Nowlin et al. ......... 318/568.11 |
| 2001/0020199 A1 * | 9/2001 | Bacchi et al. ............... 700/245 |

* cited by examiner

| Leader 12 | Follower 14 |
|---|---|
| x | x |
| y | -y |
| z | z |
| w | -w |
| p | p |
| r | -r |

MULTIPLE ROBOT ARM TRACKING AND MIRROR JOG

CROSS-REFERENCE TO RELATED APPLICATION

This application claims the benefit of U.S. Provisional Application No. 60/480,582, filed Jun. 20, 2003, the entire disclosure of which is incorporated herein by reference.

BACKGROUND OF THE INVENTION

The invention relates to jogging multiple industrial robot arms simultaneously with an incremental displacement of both a leader robot and follower robots. More particularly, it pertains to a track jog mode, in which a follower tracks the motion of the leader, and to a mirror jog mode, in which a follower mirrors the motion of the leader.

The term "jog" is a generic reference to teach-time, user-interactive robot motion. A user can teach multiple robots a path to be traversed automatically and repeatedly by teaching one robot and later transferring the taught program to other robots. This method can be tedious if during program execution the robots must execute simultaneously. After transferring the program to the other robots, when changes are required or corrections to the original program must be made, it is difficult to alter the program uniformly for each robot because continuous switching between robots is required to make these changes.

U.S. Pat. No. 3,890,552 describes a system for teaching and operating leader and follower robots to produce coordinated translation along three mutually perpendicular axes, one of the follower's translations being equal in magnitude and opposite in direction relative the corresponding translation of the leader. A switching circuit controls actuators, which produce the programmed translations. The control system produces no rotation about the axes and requires initial alignment of at least one axis of the leader and follower, and accurate spacing of the work heads of the leader from the follower so that coordinated movement can occur.

Coordinated jogging is a well known technique for producing coordinated movement of a follower robot with that of a leader robot, the relationship of the follower tool center points (TCP) to that of the leader being fixed while jogging. But coordinated jogging does not produce the same incremental motion of the follower as that of the leader. The leader frame changes when the leader moves, and the follower must maintain its relative position with respect to the leader frame. For example, when the leader rotates, the follower must rotate with respect to the leader frame and this produces longer distance movement of the follower than that of the leader.

Coordinated jogging was primarily designed to use a positioner as the leader. It was not intended for use with a robot arm as the leader or to teach multiple arm programming when the leader is a robot arm. Coordinated jogging requires users to jog each robot arm individually to a desired location and orientation, and then record the position. Furthermore, coordinated jogging does not support mirror jogging; instead, it causes the follower to move in the same direction as the leader's motion.

Multiple arm track jogging overcomes coordinated jog's shortcomings. Multiple arm track jogging produces the same magnitude of incremental motion of the leader and follower, and it supports mirror jogging. It allows a leader and follower to jog in reverse directions so that a leader and follower can cooperatively process and manipulate a symmetric workpiece concurrently.

SUMMARY OF THE INVENTION

Multiple arm tracking jogging and mirror jogging according to this invention simplify the teaching of multiple robot arms and reduce the time required to program the robots whether the robot arms are programmed to perform work on multiple identical workpieces, those that are nearly identical, or symmetric workpieces. All the robot arms jog simultaneously, either each follower tracks motion of the leader within its own active frame, or each follower mirrors motion of the leader with respect to a system default or user defined mirror plane.

Only one leader robot is required with multiple arm track jogging, but there can be multiple follower robots. Calibration between each follower robot and the leader robot is not required because the same magnitude of incremental motion is applied to the leader and the followers for both translational and rotational motion. Control of the robots can reside in a single controller, or in multiple controllers connected in a network. If the leader and the followers reside in different a controller, latency may exist due to the communication delay among the controllers, but latency does not affect real-time multiple arm program execution. Communication of the command signals among robot controllers and components can be of any form, including wired and wireless networks. The communication can also be by broadcast from the leader to allow any robot that can receive the broadcast to track or mirror the motion of the leader robot.

A method according to this invention is related to jogging multiple robots including a leader having an arm able to articulate about first axes and supporting an end effector, and a follower having an arm able to articulate about second axes. The end effector is moved to predetermined positions by jogging the arm of the leader and producing articulation about the first axes. The magnitude and direction of articulation about the first axes corresponding to movement of the end effector to said predetermined positions is recorded to facilitate subsequent automatic operation of the robots. Producing articulation about the second axes in the same respective magnitudes as the recorded articulation produced about the first axes moves the arm of the follower.

A system for performing the method of this invention includes a leader having a robot arm able to articulate about first axes and supporting an end effector. A follower includes a robot arm able to articulate about respective second axes. Servo motors articulate the leader arm about the first axes and the follower arm about the second axes. A user interface allows a user to jog the arm of the leader and to program movement of the arms for automatic execution such that the end effector reaches predetermined positions. A controller, operatively connected to the servo motors and the user interface, controls operation of the servo motors, moves the arm of the leader in accordance with the programmed movement, and moves the arm of the follower such that it tracks or mirrors movement of the leader.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The subject invention is a system 10 and method for simultaneously jogging a plurality of industrial robots. Although the system illustrated in FIG. 1 includes a leader robot 12 and a follower robot 14, any number of follower robots may be included. Each robot 12, 14 has at least one robot arm 16, which includes at least one servo motor 18A, 18B for rotating the robot arm about an axis. The servo motors 18A of the first robot 12 are operatively connected to a first set of servo amplifiers 20, and the servo motors 18B of the second robot 14 are operatively connected to a second set of servo amplifiers 22. The servo amplifiers 20, 22 are operatively connected to and controlled by a robot controller 24, or each robot 12, 14 may have its own controller, connected in a network to a central or system controller 24.

Figure 1:
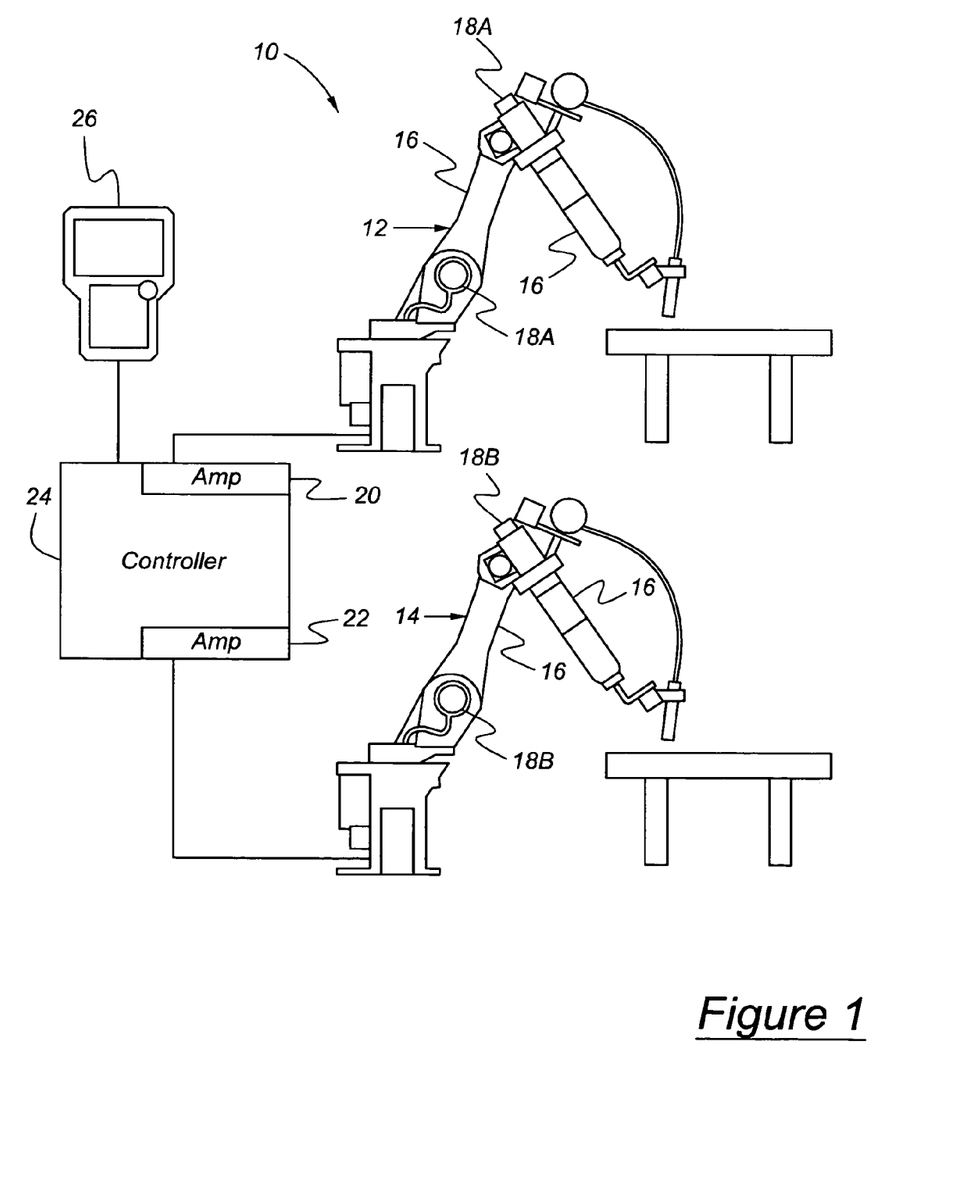
FIG. 1 is a schematic diagram of a system according to this invention for controlling coordinated displacement of industrial robots.

The invention allows the robots 12, 14 to move simultaneously and synchronously while manually jogging. This simultaneous movement is achieved by the controller 24 directing the servo motors 18A of the leader robot 12 and the servo motors 18B of the follower robot 14 to move the same incremental magnitude. The controller 24 verifies that the movement is simultaneous and synchronous by examining inputs from encoders operatively connected to the servo motors 18A, 18B and by adjusting the power applied by the servo amplifiers 20, 22 accordingly.

A teach pendant 26 is also operatively connected to the robot controller 24 for allowing a user to input information to the controller 12. The pendant includes an alphanumeric keypad and function keys that permit the user to input desired coordinates, to which the end effector of the robot arm later moves in response to control signals produced by the controller. Alternatively, the user can manually manipulate, i.e., manually jog a leader robot 12 to teach, program and record in electronic memory a pattern of movements or points on a desired path to which the leader 12 and follower 14 will move in response to control signals produced by the controller. For example, the user may move the end effector of the leader robot arm manually along a desired path and teach the robot the desired path by recording in electronic memory, accessible to the controller, significant points on the path, which are converted to the corresponding coordinates of the points and are stored in memory. A user interface having this capability is called "lead through teach."

Instead of the teach pendant 26 the user interface may be the keyboard of a PC having a CRT display. Another interface device may include joysticks, supported for translation in, and rotation about several axes, the displaced position of the joysticks being converted to electronic signals representing the desired path to be traversed or points to be reached by an effector located at the end of a robot arm 16. The path and points are taught to the system by the operator and are supplied as input to the controller. Other user interfaces that may be used for this purpose include jog wheels, force sensing devices, and other means of moving a robot in the process of teaching points including interaction devices for graphically depicting simulated robot operation.

The invention includes two modes of operating the robots 12, 14: a track jog mode and a mirror jog mode. While operating in the track jog mode, the controller issues commands to the servo motors causing each arm 16 of the follower robots 14 to perform the same translation and rotation movement as the arm of the leader robot 12. While in the mirror jog mode, the controller issues commands to the servo motors causing each arm 16 of the follower robots 14 to mirror the translation and rotation movement of the arm 16 of the leader robot 12. An operator selects the operating mode for each follower by pressing a button on the teach pendant 26 indicating the selected mode from a menu of function options displayed on a screen of the pendant or another user interface. One or more follower robots may operate in the track mode, and one or more followers may operate in the mirror mode concurrently with those in the track mode depending on the mode selected for the individual followers.

Figure 2:
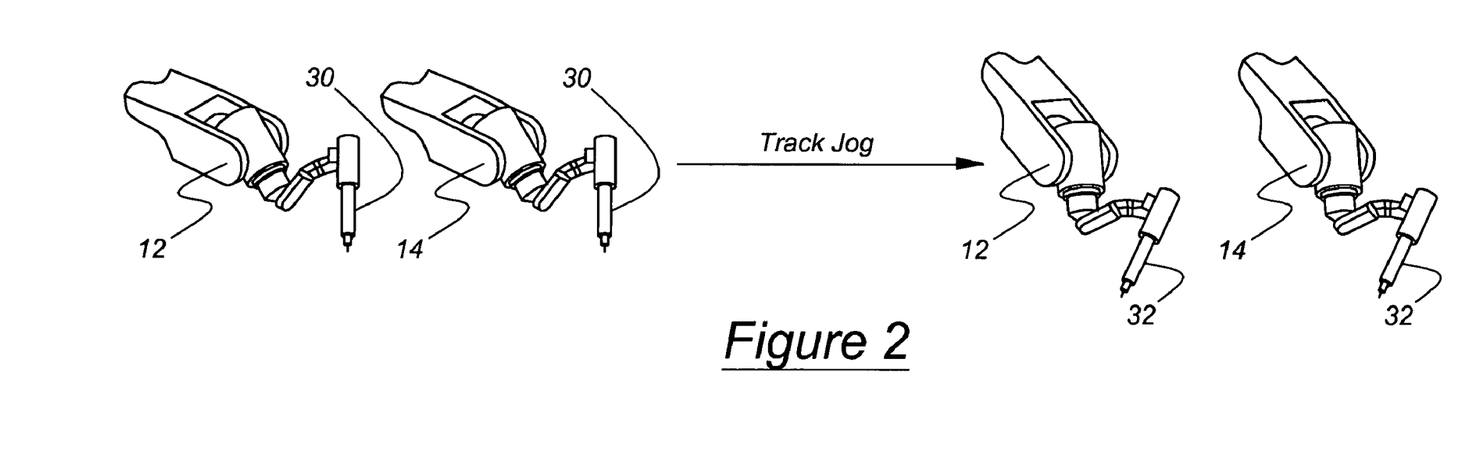
FIG. 2 is a schematic diagram showing the robots of FIG. 1 operating in a track jog mode.

FIG. 2 illustrates the results of the system operating in track jog mode showing movement of a leader robot arm 12 from an initial position 30 to a displaced position 32 and the corresponding displacement of a follower robot 14. During operation in the track jog mode, each robot arm jog with respect to its own active frame, i.e., rotates with respect to its own rotational axis and center.

Figure 3:
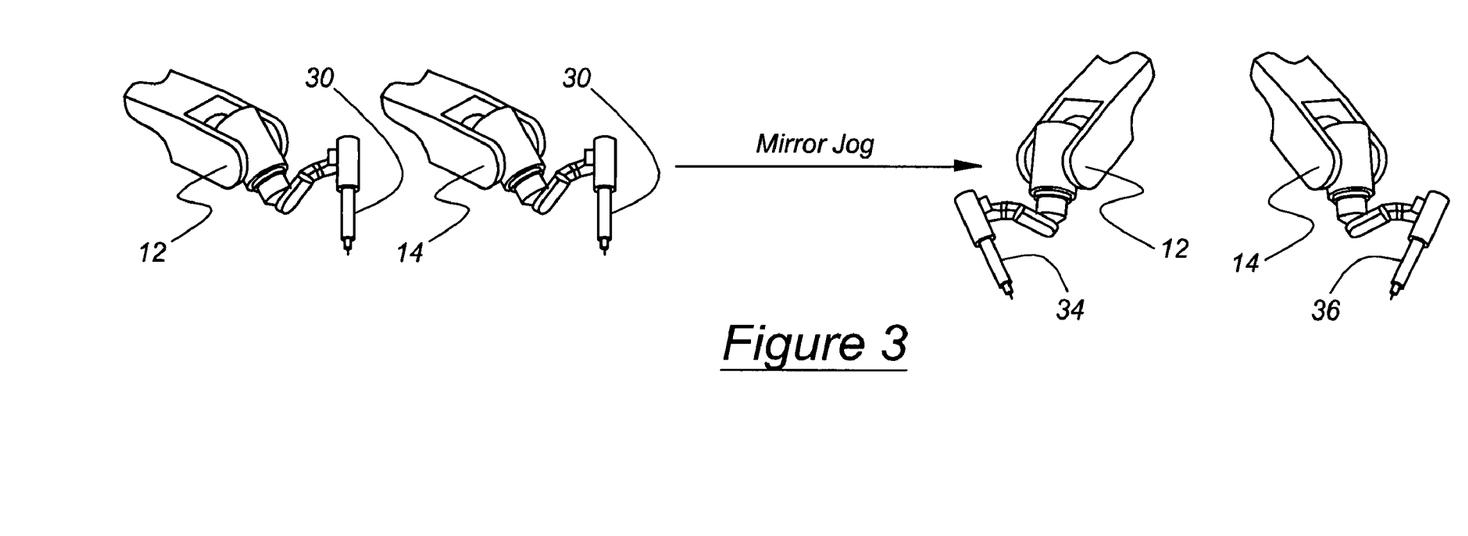
FIG. 3 is a schematic diagram showing the robots of FIG. 1 operating in a mirror jog mode.

FIG. 3 illustrates the results of the system operating in mirror jog mode showing movement of the leader robot arm 12 from an initial position 30 to a displaced position 34 and the corresponding displacement of a follower robot 14 from its initial position 30 to the displaced position 36. During operation in the mirror jog mode, the follower robot jogs the same magnitude, but in the opposite direction with respect to the direction of the leader. For example, the leader may jog as a right hand robot, whereas the follower jogs as a left hand robot.

Figure 4:
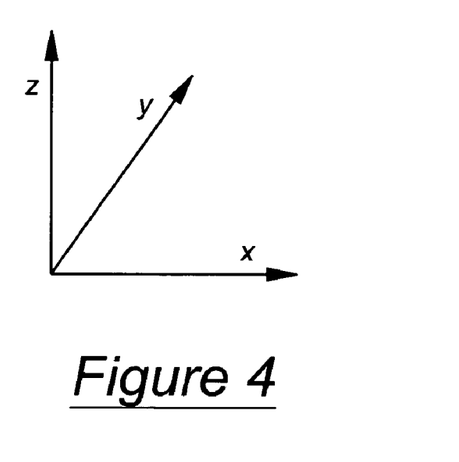
FIG. 4 is a diagram of the Cartesian coordinate axes for a right-hand robot.
Figure 5:
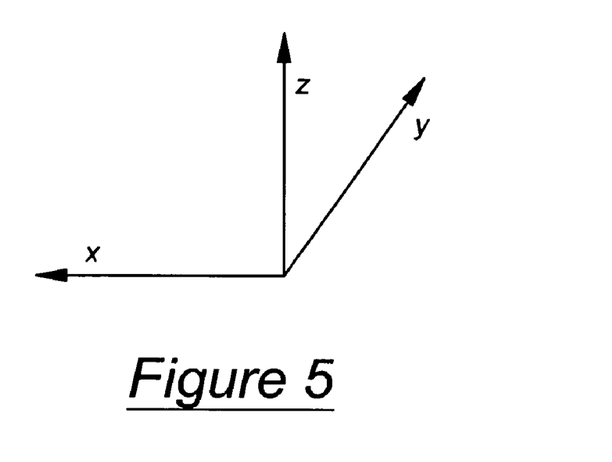
FIG. 5 is a diagram of the Cartesian coordinate axes for a left-hand robot.

FIG. 4 illustrates the Cartesian coordinate axes X,Y,Z for a right hand robot, the conventional reference coordinate system. FIG. 5 illustrates the Cartesian coordinate axes X,Y,Z for a left hand robot, a mirror image of the coordinate system of FIG. 4 when the mirror is placed in a plane parallel to the Y-Z plane. When mirror mode operation referenced to the Y-Z plane is selected, translation of the leader in the positive direction along the X-axis, produces translation of the follower in the negative direction along the X-axis. Similarly for the rotational displacements, yaw W, pitch P and roll R, when mirror mode operation referenced to a mirror plane parallel to the Y-Z plane is selected, pitch rotation of the leader in the positive direction about the Y-axis produces pitch rotation of a follower in the negative direction about the Y-axis.

Figure 6:
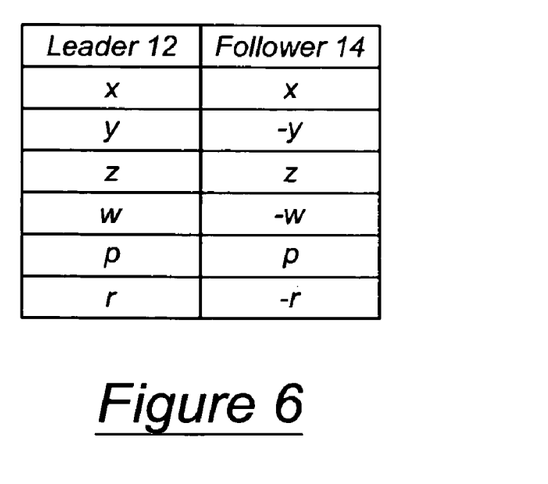
FIG. 6 shows the correspondence between translation and rotational displacements of a leader and follower when operating in a mirror mode.

The table of FIG. 6 shows the correspondence between translation and rotational displacements of the leader robot and follower robot along and about the Cartesian coordinate axes when operating in a mirror mode with the mirror plane located in a plane parallel to the X-Z plane. The frame of the follower and frame of the leader robots 14, 14', i.e., the axes of the coordinate systems, need not be mutually parallel, but may be arranged with any angular relationship. The frame of each follower robot 14, 14' may be also be arranged with any angular relationship. This permits the robots to be located and arranged on the plant floor in any convenient angular or linear relationship.

Similarly, the mirror plane may be arranged in any angular relationship relative to the frames of the leader and follower robots. The mirror plane may be parallel to a plane containing two principal axes of the leader robot frame, or it may be skewed at any angle with respect to the frames of the leader and follower robots.

When a X-Y mirror is selected by the operator, positive Z displacement of the leader robot 12 produces negative Z displacement of the follower robot 14. When a X-Z mirror is selected, positive Y displacement of the leader robot produces negative Z displacement of the follower robot. When a Y-Z mirror is selected, positive X displacement of the leader robot produces negative X displacement of the follower robot.

Frames supported by both the track and mirror modes include World frame, User frame, Tool frame, Jog frame, and Joint Jog. The tool frame can be dynamic, thus the mirror plane selected from the tool frame would also be dynamic. User-defined common tool center points (TCP), which can be shared by the leader and the follower, allow both the leader and the follower to rotate with respect to the common TCP frame, such as when two robot arms hold a heavy truck frame or the like.

Figure 7:
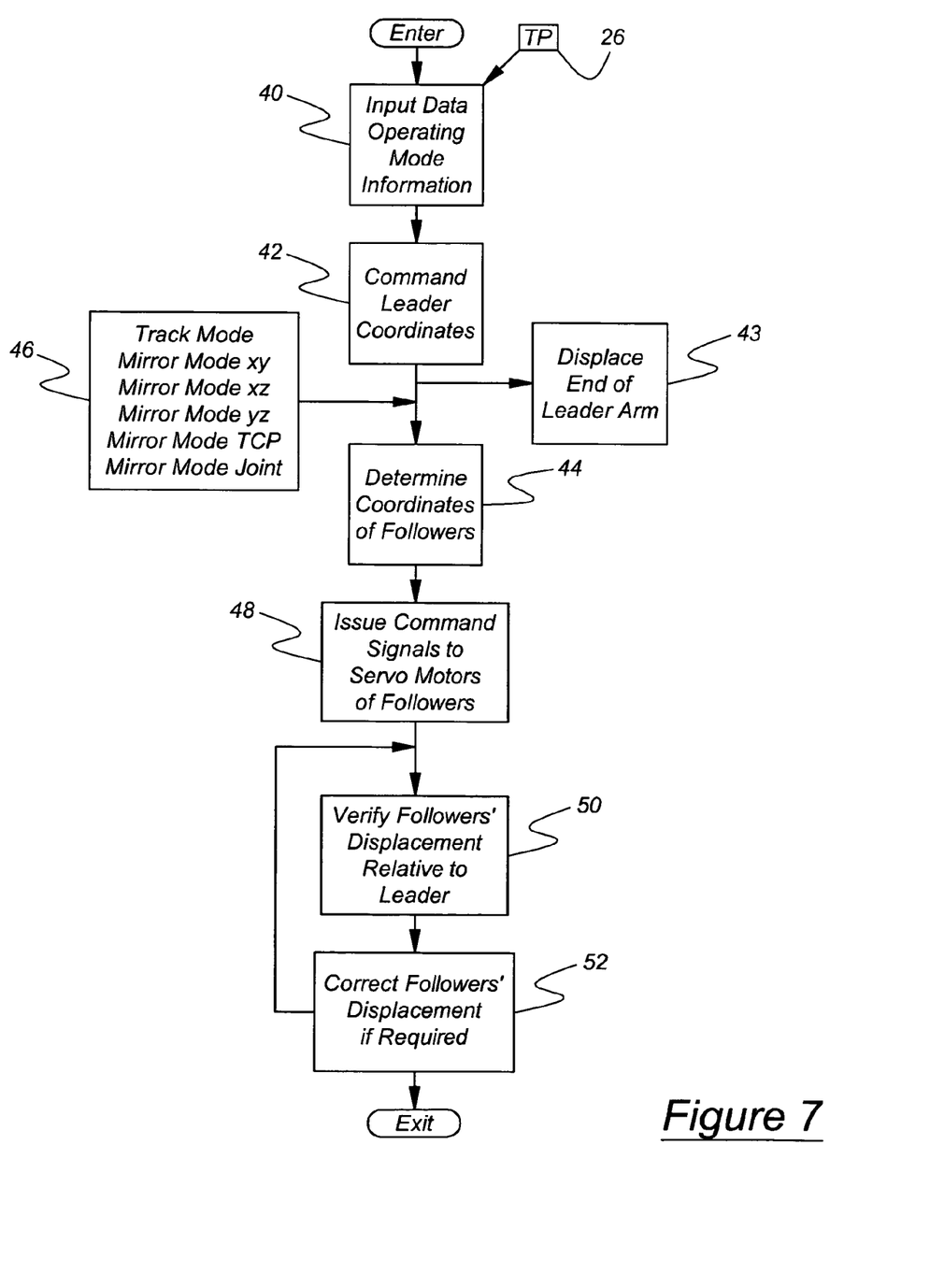
FIG. 7 is a diagram of the method steps of this invention.

Referring now to the diagram of FIG. 7, at step 40 the operator provides input information through the teach pendant 26 to the controller 24 regarding the desired path of the robots or significant points on a desired path being taught to the system, and the selected operating mode, track jog or mirror jog.

At step 42 the controller, upon executing a control algorithm that determines the desired coordinates of the end effector at the tip of arm 16 of the leader, produces command signals to the servo motors 18A of the leader 12 that will move the end effector to the points having the desired coordinates, step 43.

At step 44, the control method of this invention is executed for the selected operating mode. If the mirror mode is selected, at step 46 the corresponding coordinates of the follower are determined with reference to the coordinates of the desired destination point of the end effector on the leader 12, the frame of each follower 14, and the location and angular disposition of the mirror plane. At step 48, the controller issues command signals to the servo motors 18B of each follower 14 such that its end effector moves to the desired position.

The controller 24 optionally verifies, at step 50, that the displacement of each follower is accurate, simultaneous and synchronous with that of the leader by examining inputs from encoders operatively connected to the servo motors 18A, 18B, and by making corrective adjustments, at step 52, to the signals applied by the servo amplifiers 20, 22 simultaneously.

In the track jog mode, each follower robot tracks the magnitude of the leader incremental displacement, and produces the same amount of incremental displacement in its own active frame. A single motion command that includes track motion information of all robot arms will be issued to the system, so all robot arms can move or track simultaneously. It provides flexibility for each follower to jog in its own user-defined frame. For example, if the leader jogs in Tool frame, then all robots will jog in the Tool frame, but each robot jogs with respect to its own user defined Tool frame with the same magnitude of incremental displacement as the leader.

In mirror jog mode, each follower robot mirrors the displacement of the leader with the same magnitude of incremental displacement. The leader's motion in the user-defined frame will be converted for the follower to reflect the mirrored motion. A single motion command that includes mirrored motion information of all robot arms will be issued to the system, so all robot arms move simultaneously. With a system default mirror plane, the leader jogs as a normal right hand robot, whereas each follower jogs as a left hand robot to mirror the leader's motion. With a user specified mirror plane, each follower mirrors motion of the leader with respect to the specified mirror plane, e.g. X-Y plane, Y-Z plane, or customized mirror plane defined by a three point method.

The command for each robot can be modified to suit the specific environment for that robot. For instance, if proximity or contact is detected by a sensor or by another device, the robot can take independent action to counteract the consequences of unaltered motion. In this case, the robot could modify its path to avoid the contact, signal an external device to take some action in accordance with the impending contact, or signal the leader robot of the impending contact, whereupon the leader robot could take some action such as slowing down the command for all robots or adjusting the commanded trajectory.

Because multiple robots are attempting to follow the displacement of a single leader robot, a compliance mechanism can be used to accommodate differences in each robot's work cell. The compliance mechanism can be mechanical device integrated into the robot tooling attached to the robot arm and/or integrated into the fixture that supports the workpiece in the work cell. The compliance mechanism can also be a software compliance that uses torque or other intrinsic robot parameters to determine that the robot is in contact and to attenuate the position control allowing the robot to proceed without applying excessive force. Any of the compliance mechanisms can provide a signal to the leader robot and/or other robots of the state of the compliance.

Known obstacles or other items, such as real or virtual workspace limits, can be defined mathematically for each robot, and the leader or each robot can determine whether some action needs to be taken based on the current location of the robot and the defined obstacles.

This method can also be used as an interactive method of controlling multiple robots to perform a specific task that is not intended to teach a robot program. For example, it can be used to position cameras or other sensors in multiple robot cells or to perform other tasks where the motions of multiple robots based on the motion of a single leader robot are appropriate.

The method can be used in conjunction with one or more external positioners or other devices, which position a workpiece so that one or more robots can operate on the workpiece, such as forming or processing operations in a manufacturing process. The method is able to coordinate motion among the leader and such devices, and among all robots and their associated external positioners or other devices.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for jogging a plurality of robot arms comprising:
    a leader including a robot arm able to move within a leader active frame and supporting an end effector located at an outer end of the leader arm;
    a follower including a robot arm able to move within a follower active frame;
    first servo motors, each first servo motor articulating the arm of the leader about a respective one of the first axes;
    second servo motors each second servo motor, articulating the arm of the follower about a respective one of second axes;
    a user interface for allowing a user to jog the arm of the leader and the arm of the follower; and
    a controller operatively connected to the servo motors and the user interface for controlling operation of the servo motors, moving the arm of the leader with incremental displacement by jogging the leader arm and moving the arm of the follower with incremental displacement such that the follower arm tracks or mirrors movement of the leader arm, wherein the movements of the leader aim and the follower arm are simultaneous and synchronous.

2. The system of claim 1 wherein the controller controls operation of the servo motors such that jogging movement of the follower arm about the second axes is substantially equal in magnitude and direction within an associated active frame to jogging movement of the leader arm about the first axes, respectively.

3. The system of claim 1 wherein the controller controls operation of the servo motors such that jogging movement of the follower arm mirrors jogging movement of the leader arm about a mirror plane.

4. The system of claim 1 wherein:
    the user interface permits the user to select a mirror plane; and
    the controller controls operation of the servo motors such that jogging movement of the follower arm mirrors movement of the leader arm about the mirror plane.

5. The system of claim 1 wherein the controller comprises:
    multiple controllers, each controller being operatively connect to a robot arm for controlling operation of the servo motor of the respective robot arm; and
    a system controller operatively connected to and communicating in network with the multiple controllers.

6. The system of claim 1 wherein the system further comprises:
    first servo amplifiers operatively connected to the first servo motors;
    second servo amplifiers operatively connected to the second servo motors; and
    the controller is operatively connected to the servo motors through the first and second servo amplifiers.

7. The system of claim 1 wherein the user interface comprises one of a teach pendant, a keyboard of a PC including a CRT display communicating with the PC, a joystick, a jog wheel, a force sensing device, a lead through teach device, and a graphical display depicting simulated robot operation.

8. The system of claim 1 further comprising:
    a second follower having a robot arm able to articulate about multiple third axes;
    third servo motors for articulating the arm of the second follower about respective third axes; and
    wherein the controller controls operation of the servo motors such that the follower arm tracks movement of the leader and the arm of second follower mirrors movement of the leader.

9. The system of claim 1 wherein the incremental displacement includes at least one of translation and rotation.

10. A method for jogging multiple robots including a leader having an arm able to articulate about multiple first axes, and supporting an end effector located at an outer end of the leader arm, and a follower having an arm able to articulate about multiple second axes, comprising the steps of:
    moving the end effector to predetermined positions by jogging the arm of the leader and producing articulation about the first axes;
    recording the magnitude and direction of articulation about the first axes corresponding to movement of the end effector to said predetermined positions; and
    moving the arm of the follower by producing articulation about the second axes in the same respective magnitudes as the recorded articulation produced about the first axes including automatically articulating the follower arm about the second axes simultaneously with automatically articulating the leader arm about the first axes.

11. The method of claim 10, wherein the stop of moving the arm of the follower further comprises the step of:
    articulating the follower arm about each of the second axes is substantially equal in magnitude and direction to articulation of the leader arm about the first axes, respectively.

12. The method of claim 10 wherein movement of the follower arm mirrors movement of the leader about a mirror plane.

13. The method system of claim 10 further comprising
    selecting a mirror plane; and
    wherein movement of the follower arm mirrors movement of the leader arm about the mirror plane.

14. A method for jogging a plurality of robot arms having a jogging user interface system for jogging the robot arms simultaneously and synchronously comprising the steps of:
    assigning one robot arm as a leader;
    assigning any one of the plurality of robot aims as a follower;
    providing a controller operatively connected to the leader robot arm, the follower robot arm and the jogging user interface for controlling operation of servo motors actuating the robot arms;
    selecting a mode of jogging relating a motion of the follower robot arm to a motion of the leader robot arm;
    sending a command signal from the jogging user interface to the controller to jog the leader robot arm in a leader active frame by an incremental displacement;
    simultaneously sending a command signal from the controller to jog the follower robot arm in a follower active frame such that said follower responds to the leader's jogging movement in the leader active frame according to the selected mode of jogging, wherein jogging movements of the leader robot arm and the follower robot arm are simultaneous and synchronous.

15. The method of claim 14 wherein the mode of jogging is one of tracking and mirror imaging.

16. The method of claim 14 wherein the incremental displacement contains at least one of translation and rotation.

17. The method of claim 14 wherein the controller controls operation of the servo motors such that the jogging movement of the follower robot arm is substantially equal in magnitude and direction within the follower active frame to jogging movement of the leader robot arm in the leader active frame.

18. The method of claim 14 wherein the controller controls operation of the servo motors such that jogging movement of the follower robot arm mirrors jogging movement of the leader robot arm about a mirror plane.

19. The method of claim 14 wherein the user interface permits the user to select a mirror plane and the controller controls operation of the servo motors such that jogging movement of the follower robot arm mirrors jogging movement of the leader robot arm about the mirror plane.

20. The method of claim 14 wherein the controller controls operation of the servo motors with two of the follower robot arms such that a first of the follower robot arms tracks the leader robot arm jogging movement, whereas a second of the follower robot arms mirrors the leader robot arm jogging movement, wherein the jogging movements of the leader robot arm and the first and second follower robot arms are simultaneous and synchronous.

21. The method of claim 14 wherein the controller comprises:
   multiple controllers, each controller being operatively connect to one of the robot arms for controlling operation of the servo motor of the respective robot arm; and
   a system controller operatively connected to and communicating in a network with the multiple controllers such that track or mirror jogging movements of all network connected robot arms are simultaneous and synchronous.

22. The method of claim 14 wherein the jogging user interface for simultaneous and synchronous jog comprises one of a teach pendant, a keyboard of a PC including a CRT display communicating with the PC, a joystick, a jog wheel, a force sensing device, a lead through teach device, and a graphical display depicting simulated robot operation.

* * * * *